April 6, 1937.  C. L. FARRAND  2,075,893
SYNCHRONOUS MOTOR AND METHOD OF CONSTRUCTING SAME
Filed April 18, 1935  2 Sheets-Sheet 1
FIG_1
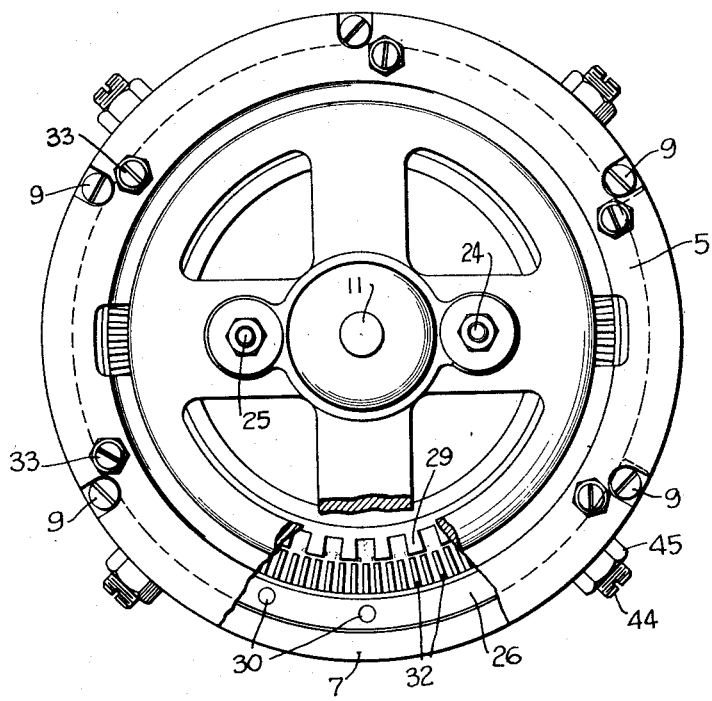
FIG_2
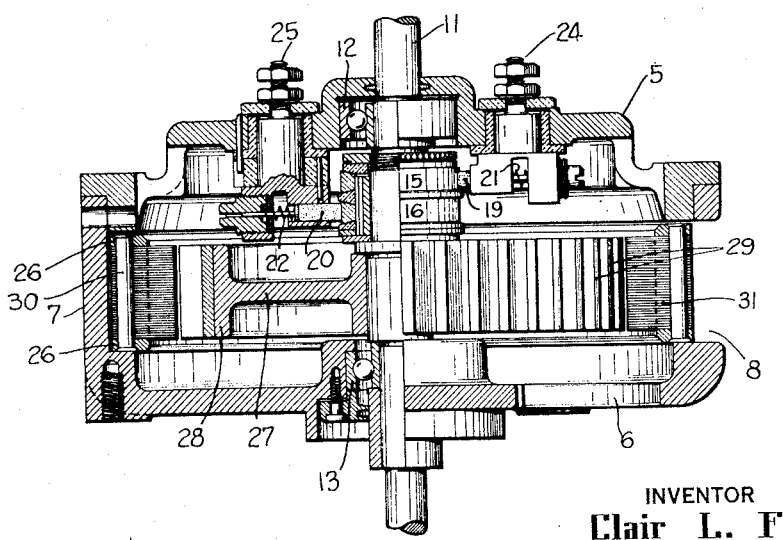
INVENTOR
Clair L. Farrand
BY
ATTORNEY April 6, 1937.   C. L. FARRAND   2,075,893
SYNCHRONOUS MOTOR AND METHOD OF CONSTRUCTING SAME
Filed April 18, 1935   2 Sheets-Sheet 2
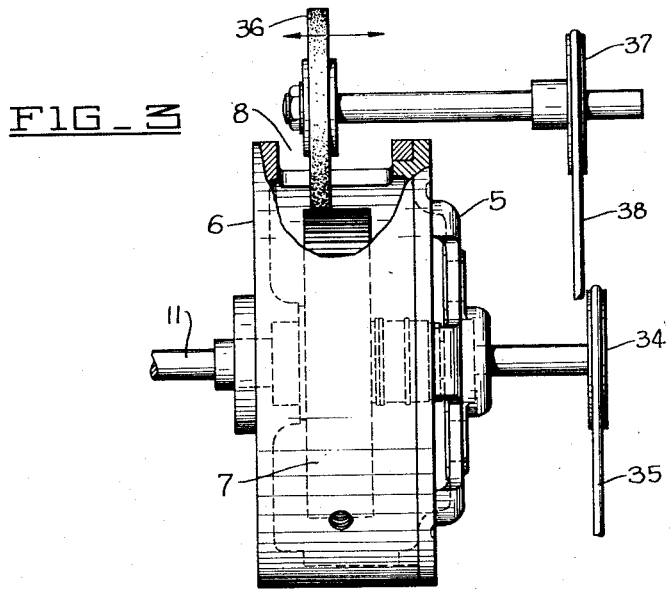
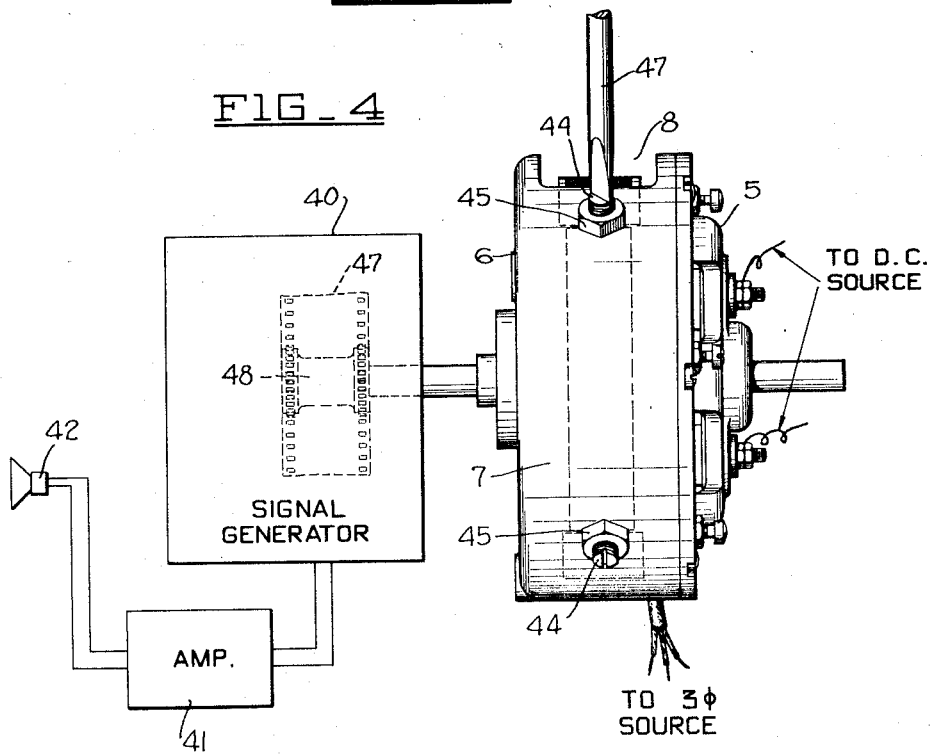
INVENTOR
Clair L. Farrand
BY
ATTORNEY Patented Apr. 6, 1937

2,075,893

UNITED STATES PATENT OFFICE 2,075,893

SYNCHRONOUS MOTOR AND METHOD OF CONSTRUCTING SAME

Clair L. Farrand, Larchmont, N. Y., assignor to United Research Corporation, Long Island City, N. Y., a corporation of Delaware Application April 18, 1935, Serial No. 17,097

7 Claims. (Cl. 171—252)

This invention relates to synchronous motors having a velocity or rotational speed which is uniform and constant to a much higher degree than is obtainable from ordinary commercial synchronous motors, and particularly to a method of constructing such a motor. The present motor is relatively constant in velocity. A constant velocity is desirable as small periodic variations are noticeable to the ear when they produce a corresponding change in audible frequencies, as in the case where such a motor is used to progress a record carrier either in recording or reproducing.

The motor hereinafter described has been designed for use in sound recording and reproducing wherein it directly drives a sprocket on, or adjacent which, sound waves are to be translated to or from a record carrier, such as a film. The object of the invention, therefore, is to construct a motor of simple design having a constant speed of rotation. To obtain such constancy, various constructional features have been embodied in the motor.

The motor has a minimum of parts, these parts being given a symmetry and concentricity in a novel manner. For instance, certain rotating parts of the motor are ground in as nearly a complete assembly as possible, while adjustments have been provided which can be made during the actual running of the motor. Since these final adjustments can be made during the running of the motor under load, they provide a better result than is possible to obtain by static adjustments interposed between tests.

In general the motor is designed with its armature stationary, and, without departing from the invention, may be wound for any desired speed. In the present case the armature has 120 teeth and is wound for three phase, 60 cycle energy, with one turn, per tooth, per phase. It is constructed of laminated sheet steel clamped by rivets between heavier steel reenforcing rings. The field is mounted on a solid steel rotor and consists of 40 poles wound with fine wire supplied from a direct current source through two slip rings. With a 60 cycle supply, a speed of 180 R. P. M. is obtained.

The salient features of the motor and its method of construction will be more clearly understood by reference to the following detailed description read in conjunction with the accompanying drawings in which:

Fig. 1 is an end view partly in section of the motor.

Fig. 2 is a cross-sectional view perpendicular to the rotor shaft of the motor.

Fig. 3 shows the rotor being ground; and

Fig. 4 shows the final stator adjustment.

Referring specifically to Figs. 1 and 2, in which the same numerals identify the same elements, the external frame or casing of the motor comprises two end bell portions 5 and 6, the bell 6 having a cylindrical flange 7 for spacing and connecting the bells 5 and 6, as by screws 9. A rotor shaft 11 is mounted upon roller bearings 12 and 13 journalled in the end bells 5 and 6, respectively. On the shaft 11 are mounted slip rings 15 and 16 which are electrically connected to the field windings of the rotor. Connections to the slip rings are made externally through brushes 19 and 20 held in position and against the slip rings by springs 21 and 22, respectively. The brushes are electrically connected to terminals 24 and 25.

As shown in the drawings, the rotor is of solid metal, such as steel, having the form of a T with a web 27 and flange 28, thus reducing the mass of the rotor to a minimum. The flange has been milled into forty divisions 29, thus constituting the poles. This section is statically and dynamically balanced in accordance with well known commercial practice. The stator 31 is composed of laminated sheet steel, the laminations being rivetted together by rivets 30 through rings 26 to form a compact unitary structure. It is positioned and held laterally in the frame by screws 33 and positioned and held concentrically with the rotor by screws 44. This element of the motor is ground on a lathe until its internal circumference is perfectly circular.

Reference is now made to the cut away portion of Fig. 1 in which the pole pieces 29 and armature teeth 32 are shown in operative relationship. The windings, of any well known solenoidal type, have been omitted for clearness of illustration, and it will be observed that there are three teeth of the armature for each pole of the field which provides a speed of 180 R. P. M. when the armature is supplied with 60 cycle three-phase energy. As mentioned above, the armature is wound with one turn, per tooth, per phase, these windings being flat copper strips completely filling the armature slots when insulated therefrom, while the protruding portions may be narrowed to make connections to the strip in the next phase slot.

One of the chief causes for variations in synchronous motors is that due to eccentricity of the rotating elements after assembly, which not only destroys the balance of the rotating parts, but varies the air gap thus eliminating the desired uniform magnetic field. The present invention contemplates a method of avoiding this condition. One of the steps of this method is to grind the complete rotor in position, that is, the rotor is on its shaft, the shaft in its bearings, and the casing or frame fastened together in its final position. The only element missing from the complete assembly is the stator.

Referring now to Fig. 3, the assembly just mentioned is shown with a pulley 34 and belt 35 connected to the rotor shaft 11 for turning it, and a grinding wheel 36 driven through a pulley 37 and belt 38. It will be observed that in the flange 7 an opening 8 is provided permitting the entrance of the grinding wheel 6 to the rotor. Both the grinding wheel and rotor are now operated, the grinding wheel being moved transversely of the motor during the grinding operation.

The result of this method of grinding is that it provides concentricity of the rotor with respect to its bearings. In using ball bearings, it is essential that the inner race rotate concentrically in all positions of the ball race, and these must be held within one-tenth of one one-thousandth of an inch. If each grinding occurred separately, any error in each grinding process could very well accumulate into considerable magnitude when the finished motor was assembled. With the grinding of the motor as above described, any eccentricity that may be present in the bearings or any inaccuracies in the housing parts will be taken care of so that perfect concentricity of the rotor in its final operating position will be obtained.

After this grinding operation, the motor is taken down and reassembled with the stator in position, as shown in Fig. 4. Now since the stator has been ground to a circular form and, as the external circumference of the rotor has been ground to rotate in a perfect circle on its bearings, the next step is to obtain a uniform gap between the armature and rotor. This may be accomplished in a rough manner statically with the final adjustment being made with the motor operating under its owen power as follows:

The motor is connected to a signal generator 40 which may be any means for producing an audible musical note such as a toothed wheel, disc record, film record, or other means, the illustration showing a sound film 47 containing a certain audible frequency recording being progressed by a sound sprocket 48 driven directly by the motor. The output of the signal generator 40 may be connected through an amplifier 41 to a sound reproducer 42 in any well known manner. For the final adjustment, the motor is energized by connecting the field to a D. C. source and the armature to a three-phase 60 cycle source, permitting the motor to operate the signal generator to produce the audible tone. If any eccentricity exists there will be a periodic tone produced once per revolution and this tone will be easily detected in the reproducer 42. The adjusting screws 44 are now moved in or out in any desired manner, such as by a screw driver 47, until this periodic tone has been removed when the locknuts 45 are tightened in place. The construction is such that the space between the outer circumference of the stator and the flange 7 is less than the space between the stator and the rotor, thus preventing any contact between the stator and rotor during running adjustments.

The above synchronous motor has been described as a device for obtaining a constant rotational speed and it has been found that it is far superior to any now known. The method of obtaining perfect concentricity by grinding in assembly and making final adjustments between the stator and rotor during operation of the motor are believed to be novel features in the manufacture of a synchronous motor.

What is claimed is:

1. The method of producing a concentric relationship between stationary and rotatable members comprising separately grinding the operating face of said stationary member to a circular form and grinding the operating face of said movable member co-operating with the operating face of said stationary member to a circular form while in position with respect to said stationary member.

2. The method of obtaining a concentric relationship between stationary and rotatable members comprising separately grinding the operating face of said stationary member to a circular form, grinding the operating face of said rotatable member co-operating with the operating face of said rotatable members while in position with respect to said stationary member, and adjusting the face of said stationary member with respect to the face of said rotatable member during the running of said motor under its own power.

3. A method of adjusting the stator of a machine with respect to the rotor thereof comprising adjusting the position of said stator with respect to said rotor during the running of said machine under its own power.

4. A dynamic electrical machine structure comprising a housing including two end bells, one of said bells having an integral flange for connecting said bells to form said housing, a rotor in said housing, and a stator between said rotor and said flange, the distance between said stator and said flange being less than the distance between said rotor and said stator.

5. The method of adjusting the air gap between the stator and rotor of a motor comprising operating said motor under its own power to reproduce a standard frequency tone, the uniformity of the air gap determining the quality of said tone, and adjusting said stator with respect to said rotor during the generation of said tone.

6. The method of adjusting the air gap between the stator and rotor of a synchronous motor comprising operating said motor under its own power to reproduce a single frequency audible tone and adjusting said stator with respect to said rotor during operation of said motor until said tone is free of any periodicity once per revolution of said rotor.

7. The method of obtaining concentricity between the outer surface of a rotor and its axis of rotation which comprises assembling the rotor in its bearings with the field frame while leaving out the field magnet, thereby providing space for a grinding tool and in grinding the outer surface of the rotor to concentricity with the center line through said bearings while thus assembled.

CLAIR L. FARRAND.